Nov. 18, 1947.         R. EKSERGIAN         2,431,296
          COMPRESSION TESTING APPARATUS
    Original Filed April 24, 1941    5 Sheets-Sheet 1
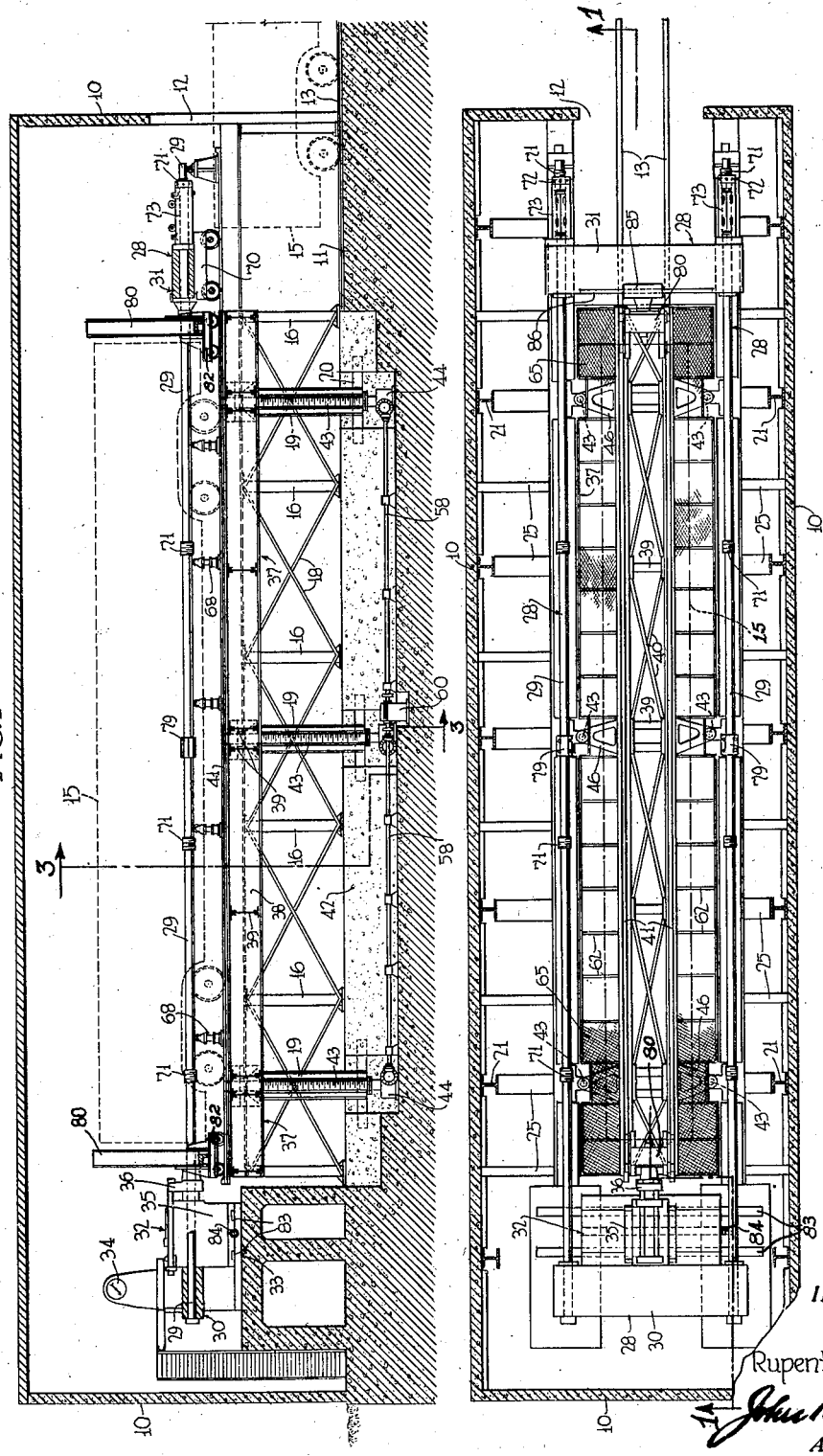
INVENTOR
RupenEksergian
ATTORNEY Nov. 18, 1947. R. EKSERGIAN 2,431,296
COMPRESSION TESTING APPARATUS
Original Filed April 24, 1941  5 Sheets-Sheet 3

INVENTOR
Rupen Eksergian.
BY *John P. Forbes*
ATTORNEY

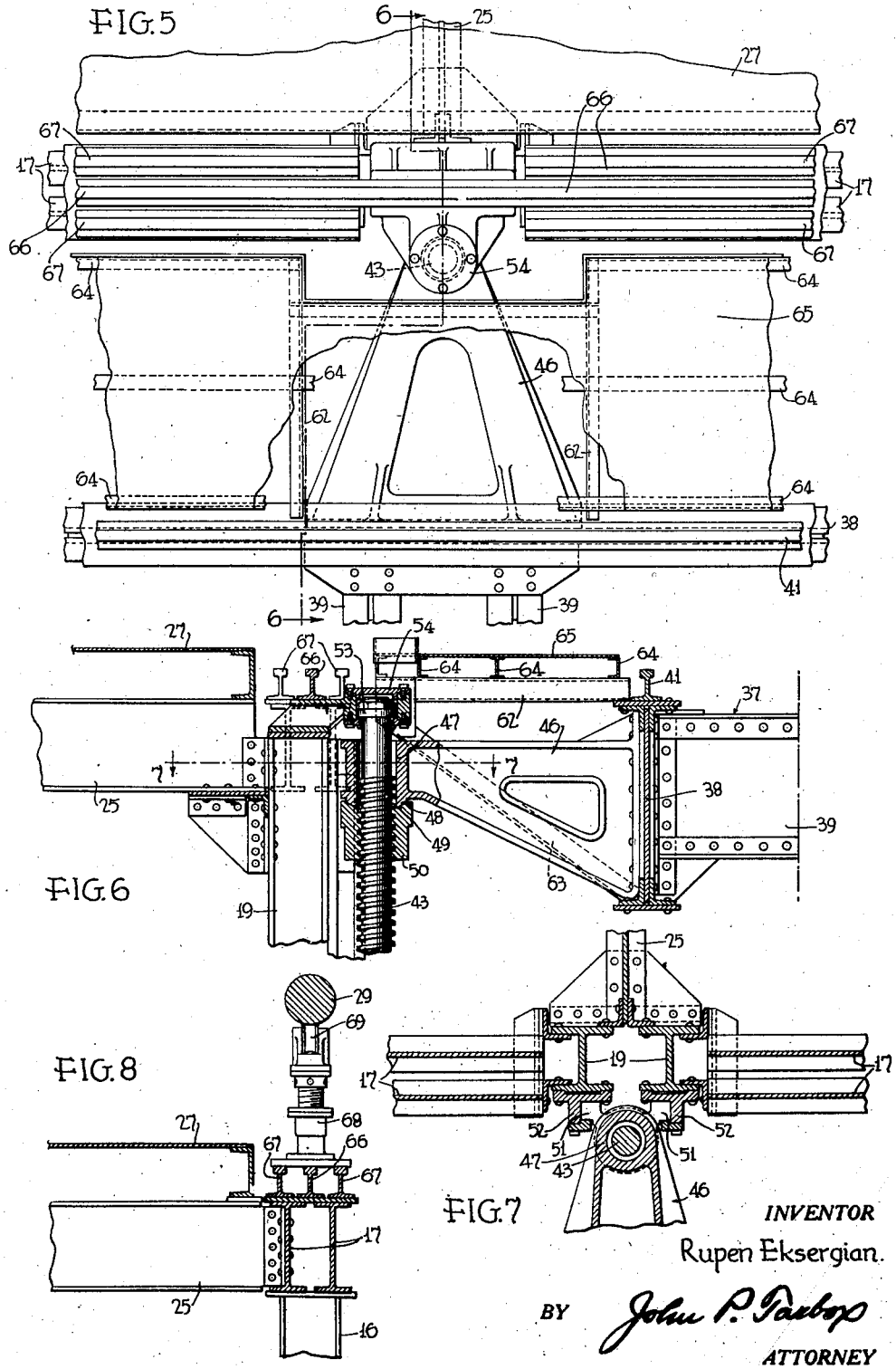

Nov. 18, 1947.                R. EKSERGIAN                2,431,296
                       COMPRESSION TESTING APPARATUS
                  Original Filed April 24, 1941    5 Sheets-Sheet 5

INVENTOR
Rupen Eksergian
BY
John P. Taylor
ATTORNEY

Patented Nov. 18, 1947

2,431,296

UNITED STATES PATENT OFFICE 2,431,296

COMPRESSION TESTING APPARATUS

Rupen Eksergian, Media, Pa., assignor to The Budd Company, Philadelphia, Pa., a corporation of Pennsylvania Continuation of application Serial No. 390,065, April 24, 1941. This application July 27, 1944, Serial No. 546,772

12 Claims. (Cl. 73—94)

This is a continuation of patent application Serial No. 390,065, filed April 24, 1941.

The invention relates to testing apparatus, and more particularly to such apparatus designed for the testing of large structures such as railway car body structures.

Apparatus has heretofore been devised for testing the compression strength of car bodies, for instance, in the line of draft, but such apparatus has been limited in the scope of its application and has not furnished very extensive test data by which the car builder could supplement or check the calculated stress in the various parts of the structure as a guide to future design. Nor has such apparatus, as heretofore utilized, been sufficiently powerful to exceed in substantial degree the strength requirements as established by the R. M. S. (railway mail service) and the A. A. R. (Association of American Railroads).

It is an object of the invention to overcome the limitations of prior such test apparatus and to provide a very powerful testing apparatus capable of testing the car body structure under longitudinal compression either as a whole or at any level for the full width of the body, or at any localized area of said width.

It is a further object of the invention to provide an apparatus of this class which is adapted to readily test the car body structure by a laterally directed force applied at different locations in the height and length of the structure, or by laterally directed forces applied at a plurality of locations simultaneously.

It is a further object of the invention to provide a testing apparatus of this class which is readily adaptable for different-length structures or structures of various types differing from the usual railway car body structures.

It is a further object of the invention to provide an apparatus of this class which enables the car body to be readily brought in position for testing any particular part or parts or the whole car structure, as desired.

These objects are attained in large measure by building the test apparatus upon a massive foundation structure forming the floor of the plant and constructing the longitudinal compression-testing device as part and parcel of the structure for taking the reactions from the lateral compression testing. According to the invention, the set-up may comprise lateral parallel structures rising from the foundation structure and strongly anchored thereto, these structures comprising two rows of aligned spaced pillars extending a length somewhat greater than the length of the longest structure to be tested, these pillars being of a height somewhat greater than the height of the cars to be tested, and interconnected at their tops by longitudinal beams. Suitable means are provided to brace the pillars laterally so as to take the lateral reactions incident to the transverse testing of the structure.

Between the rows of pillars is arranged a long platform normally at floor level, having rails secured to it in line with rails of a trackway extending from the outside of the plant, so that a rail car may be readily moved by a switching engine or otherwise upon the testing platform. The main longitudinal compression-testing machine of the apparatus may comprise a powerful press, preferably a hydraulic press, cooperating with a powerful rectangular frame of longitudinal and lateral dimensions more than enough to receive a car structure to be tested within its confines, the side members of this frame comprising heavy tension rods interconnected by the end members or abutment bars or beams. The press comprises, as usual, two members for exerting a thrust in opposite directions which are, in the case of a hydraulic press, formed by a casing including a cylinder and a plunger working in the cylinder. The press has its axis of thrust generally paralleling the rods and in the plane of the rods normally midway between them. It is supported upon a solid platform built up from the foundation with its thrust axis above the tops of the pillars. One end of the rectangular frame, including a transverse abutment beam of the frame, and the adjacent ends of the tension rods are rigidly supported by the platform with the beam in abutting relation to the hydraulic press, while the major portion of the lengths of the rods and the transverse abutment beam remote from the press are supported by the spaced rows of pillars and the beams interconnecting each row.

The platform supporting the car and the longitudinal compression machine are relatively movable vertically or at right angles to the plane of the frame of the machine to bring any desired level of the body in line with the machine. The means for effecting such relative movement may comprise a plurality of vertical screws supported in certain of the pillars in each of the rows threaded through brackets projecting laterally of the platform, said screws being power-driven at the same speed to lift or lower the platform while maintaining it parallel to its successive positions.

In the main, these are the features through which the objects above enumerated are attained, but, in the following detailed description, other and further objects and advantages and the means by which they are attained will become apparent.

In the drawings:

Fig. 1 is a longitudinal sectional elevation through the test apparatus of the invention and the building housing the same along line 1—1 of Fig. 2;

Fig. 2 is a plan view of the apparatus with the walls of the building structure shown in section;

Fig. 5 is an enlarged fragmentary plan view with parts broken away, showing the structure in the region of one of the platform-elevating screws;

Fig. 6 is a fragmentary sectional view taken substantially on the line 6—6 of Fig. 5, looking in the direction of the arrows at the ends of the section line;

Fig. 7 is a fragmentary sectional plan view along the line 7—7 of Fig. 6, looking in the direction of the arrows;

Fig. 8 is a detail fragmentary transverse sectional view through one of the tension rods and the supporting structure therefor;

Figure 3:
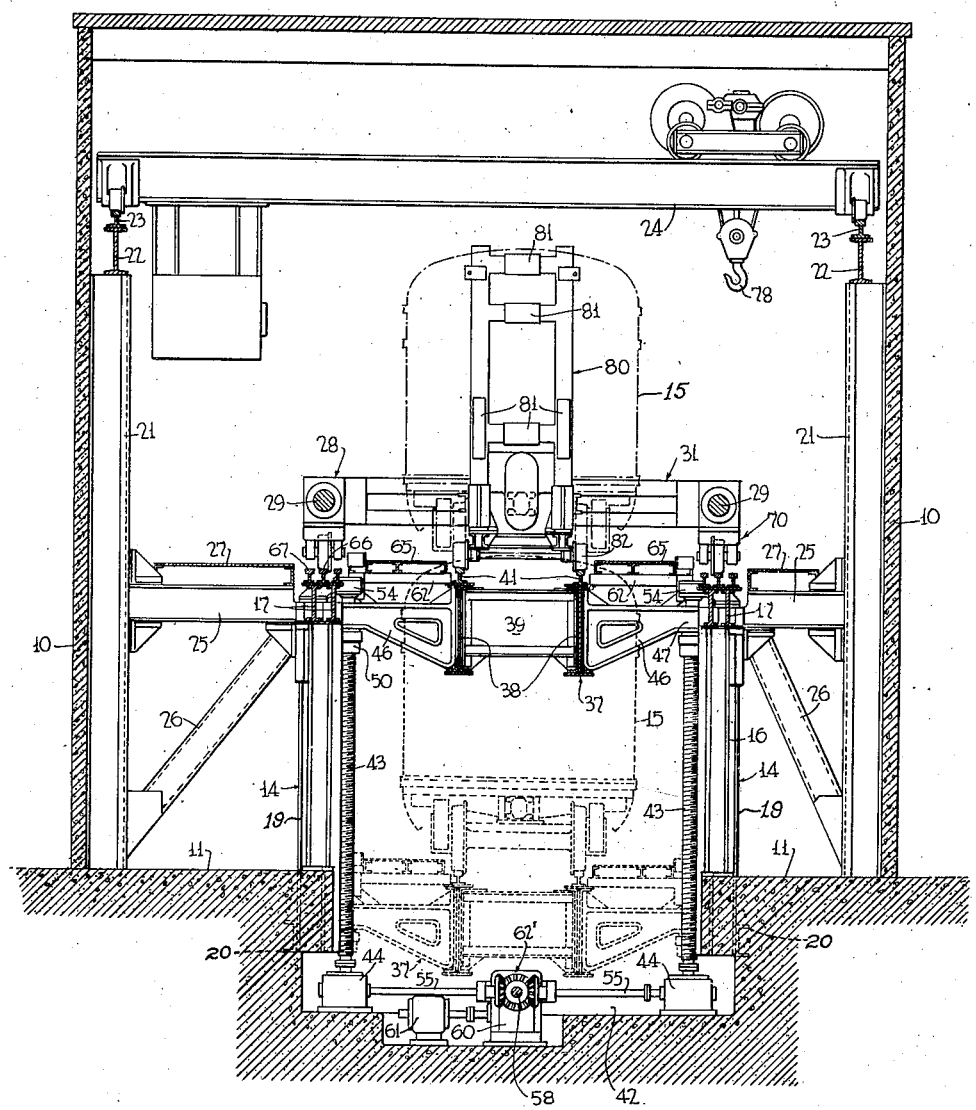
Fig. 3 is a transverse sectional view through the building and the apparatus housed by it, the section being on an enlarged scale and taken substantially along line 3—3 of Fig. 1.

In the drawings, the invention is shown housed within a long narrow building, the walls of which are indicated by 10 and the foundation or floor of which is indicated by 11. One end of the building is provided with a doorway 12, through which the rails 13 of a track extend from the outside of the building to permit the bringing of a car to be tested to the testing apparatus.

The testing apparatus may comprise, as shown, two spaced parallel supporting structures, designated generally by the reference character 14, which serve the dual function of carrying a portion of the weight of the longitudinal compression-testing machine, and also serve to take the reactions in testing a structure, such as a rail car body, generally indicated at 15, for lateral compression.

Each of these supporting structures 14 may comprise an inner series of equally spaced pillars 16 securely anchored at their bases to the foundation 11 and connected at the top by longitudinal beams 17 which may consist of a pair of I-beams located side by side as shown in Fig. 3. The structure so formed by the longitudinal beams 17 and the pillars supporting them is preferably rigidly braced by the diagonal tension rods 18. In addition to the vertical pillars 16, three equally spaced pillars 19 strongly anchored on the foundation at 20 extend upwardly to and are secured rigidly to the longitudinal beams 17. As shown in Fig. 7, these pillars are formed by two I-beams, and the longitudinal I-beams forming the beams 17 are cut at these locations and secured together and to the I-beams of the pillars by angular or other gussets.

The tops of the supporting structures formed by the members 16, 17, 18 and 19 are of an elevation from the floor approximately equal to the height of the car 15.

To enable these structures to take the lateral thrusts incident to the transverse compression testing, they are braced to a series of lateral pillars 21 flanking the adjacent lateral wall of the building and extending near the top of said wall. These lateral pillars 21 are connected by longitudinal beams 22 which carry tracks 23 for receiving an overhead traveling crane 24. The pillars 16 and 19 are braced to these pillars 21 by horizontal beams 25 and diagonal braces 26. The beams 25 also serve to support the walkway 27. It will be noted that the supporting structures at the opposite sides are substantially similar, although one of them (as shown in Fig. 3, the one at the left) may be wider, and provide a wider walkway and space for temporarily supporting the parts of the test apparatus not in use.

As previously pointed out, the compression machine of the test apparatus is partly supported by the lateral supporting structures 14. In general, the compression machine may comprise (see Fig. 2) a rectangular frame, designated generally by the numeral 28 and consisting, in the form shown, of two spaced tension rods 29 interconnected at one end by a massive transverse abutment beam 30 and, adjacent its opposite ends, by a similar beam 31.

In addition to this main frame 28, the compression machine comprises a powerful hydraulic press, designated generally by the numeral 32, which is supported from the foundation by a platform 33 raised a substantial distance above the floor level. This platform is the operator's control station, from which he controls the compression machine. The machine is provided with a suitable gauge or gauges, one of which is indicated at 34, from which the pressure of the hydraulic fluid in the cylinder of the press may be read by the operator at the control station.

The hydraulic press may comprise a casing 35 and a plunger or ram 36, the line of thrust of which is normally parallel to the tension rods 29 and in their plane, and located midway between the rods. By reference to Fig. 2, it will be seen that the abutment beam 30 has its inner face bearing against the casing 35 of the hydraulic press, and the work to be tested is normally located in the space between the press 32 including its plunger 36, and the abutment beam 31. The end of the plunger remote from the beam 30 constitutes a work engaging member. By operating the press so that the ram or plunger 36 is forced outwardly, it will be seen that a powerful compressive stress can be applied to the car structure being tested, the reaction of which is taken entirely within the rectangular frame formed by the tension rods 29 and the abutment beams 30 and 31.

The compression machine shown has a capacity of 2,000,000 lbs. applied through a 30"-diameter ram or plunger having a 24" stroke.

To enable the car structure to be tested at various levels and for the full width of the car, it is desirable that the compression machine and the car body being tested may be readily relatively adjusted vertically with respect to each other. In the machine disclosed, this is accomplished by adjusting the position of the car body. To this end, the car body is supported upon a platform, designated generally at 37, which platform, as shown in Fig. 2, is located in the space between supporting structures 14 and the rectangular frame 28 of the compression machine, and of a length to readily accommodate the longest rail cars.

This platform may comprise a truss consisting of two vertically deep beams 38 interbraced by transverse beams 39 and diagonals 40 to form a rigid structure. Directly above the vertically deep beams 38 are secured the rails 41 for supporting the car body. These rails extend the length of the platform and meet the rails 13 of the track leading outside the building so that, when the platform 37 is in the lowered position, shown in Fig. 3 in dotted lines, the car to be tested may be run onto the platform from the rails 13.

It will be noted that the platform, in this lowered position, is disposed in a well 42 sunk beneath the level of the floor 11. The platform is supported for vertical movement by six screws 43, each of which is supported at the bottom in a casing 44 carrying suitable antifriction thrust and radial bearings.

The manner of support of the platform 37 from these screws is clear from an inspection of Figs. 2, 3, 5, 6 and 7. At the location of each screw, the platform is provided with a lateral bracket 46, which is strongly secured to the adjacent vertically deep beam 38, and has its outer end provided with a collar 47 loosely surrounding the screw. This collar has a ball face 48 resting in a corresponding face 49 formed in the top of a nut 50 carried by the screw 43. The nut is guided by ears 51 integral therewith, projecting into the channel grooves of members 52 secured to the two I-beams forming the pillars 19. The upper end of the screw 43, as shown in Fig. 6, is provided with a head 53 and supported in a bearing housing 54 secured to the longitudinal beams 17.

The aforedescribed arrangement for supporting the carriage from the screws avoids binding and facilitates the smooth operation.

Figure 4:
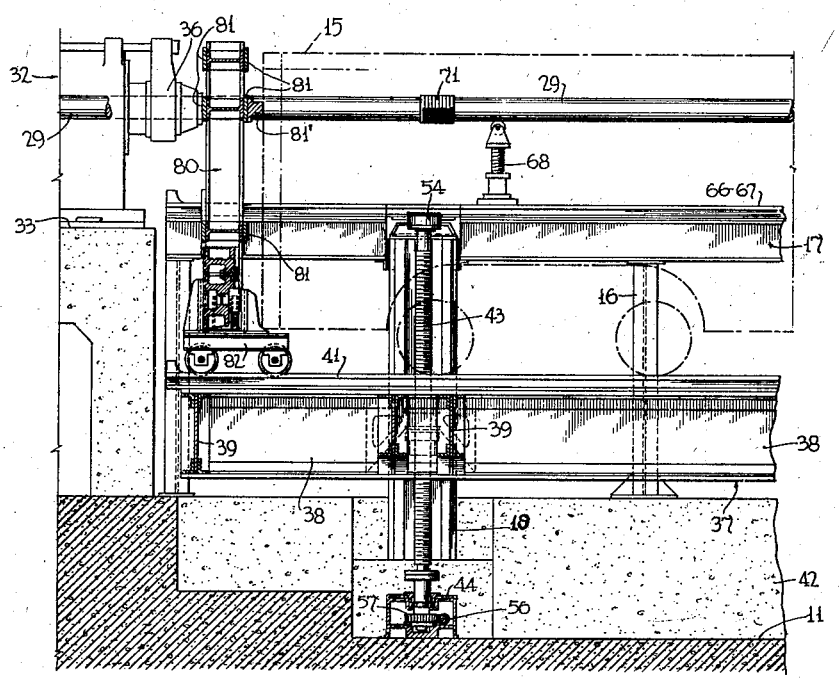
Fig. 4 is a fragmentary section similar to Fig. 1 on an enlarged scale showing more of the detail with the platform at a lower level than in Fig. 1.
Figure 11:
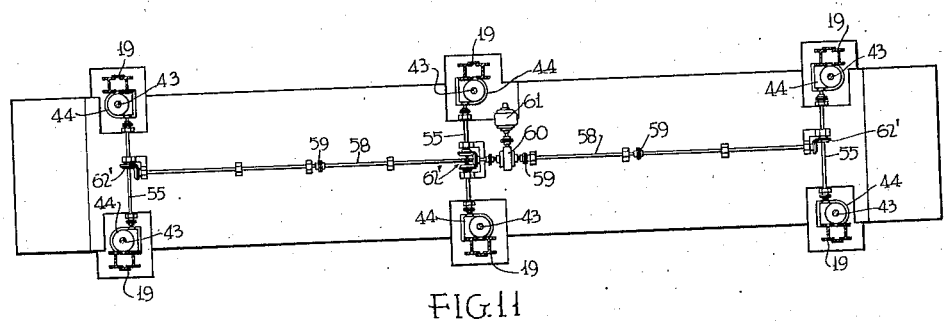
Fig. 11 is a diagrammatic part-sectional plan view showing the drive to the elevating screws for raising and lowering the platform.

The means for rotating all of the screws 43 at a uniform rate, so that the platform may be maintained level, may consist, as best shown in Fig. 11 and Fig. 4, of shafts 55 connected to drive the opposed pairs of screws 43 through worms 56 and worm wheels 57 arranged in the casings 44. These transverse shafts 55 may all be connected together to be driven at the same speed by the longitudinal shaft 58 which may be in sections connected together by coupling members, as 59, for ease of assembly. The shaft 58 is driven through reduction gearing in the gear housing 60 from motor 61. The driving connection between the longitudinal shaft 58 and the transverse shafts 55 is through beveled gearing 62' of like ratio.

Thus it will be seen that all of the screws 43 for raising and lowering the platform 37 are driven at uniform speed from a common prime mover, thereby preventing binding of parts, and maintaining the platform level at all times.

The platform 37 is further provided, throughout its length, with spaced laterally extending braces, each consisting of a horizontal member 62 secured to the top of the adjacent beam 38, and a diagonal member 63 secured to the bottom of said beam at its inner end and to the horizontal member 62 at its outer end. These braces 62, 63 support the longitudinal stringers 64 and the flooring 65 which closes the space between the foundation flooring 11 of the building and the rails 41 of the platform. This flooring also provides a walkway for the operators when the platform is in any position. As shown in Fig. 5, the flooring 65 is cut back to clear the lifting screws 43.

As is clearly shown in Fig. 1 and Fig. 8, the tension rods 29 are supported by struts 68 from the beams 17. The beams 17 are stiffened at the top by a through-running central rail 66 and two parallel lateral rails 67 which latter are broken at the pillars 19 (see Fig. 5). These struts carry, at their upper ends, a grooved roller 69 directly engaging the rod and are vertically adjustable to permit accurate leveling of the rod 29 throughout its length. Moreover, these struts 68 are removable to permit movement of the abutment beam 31 along the rods 29.

To permit free longitudinal movement of the ends of the rods 29 remote from the hydraulic press 32, the abutment beam 31 is mounted for longitudinal movement upon a wheeled carriage 70 which runs on the spaced rails 66.

A feature of the apparatus is the provision for readily adjusting the longitudinal position of the abutment beam 31 along the tension rods 29 to accommodate the machine to different lengths of work. To facilitate this, each of the rods is provided at widely spaced points along its length with short screw-threaded portions 71, one of these portions being at the extreme end of each rod. These screw-threaded portions are of a larger diameter than the main body of the rods and are adapted to receive the nuts 72 forming the shoulders against which the abutment bar 31, which is loosely slidingly received on the rods to permit its movement from end to end thereof, may bear either directly or through the intermediary of spacer sleeves 73, surrounding the rods 29 and interposed between the nuts 72 and the abutment beam 31. Any number of such spacer sleeves of a given length may be employed in connection with the machine. By using one or more of these sleeves between the nuts 72 and the abutment beam 31, a coarse adjustment of the length of the compression frame may be readily made. To effect a finer adjustment of the length, the nuts 72 are adjusted through their screw-threaded connection with the rods.

Figure 12:
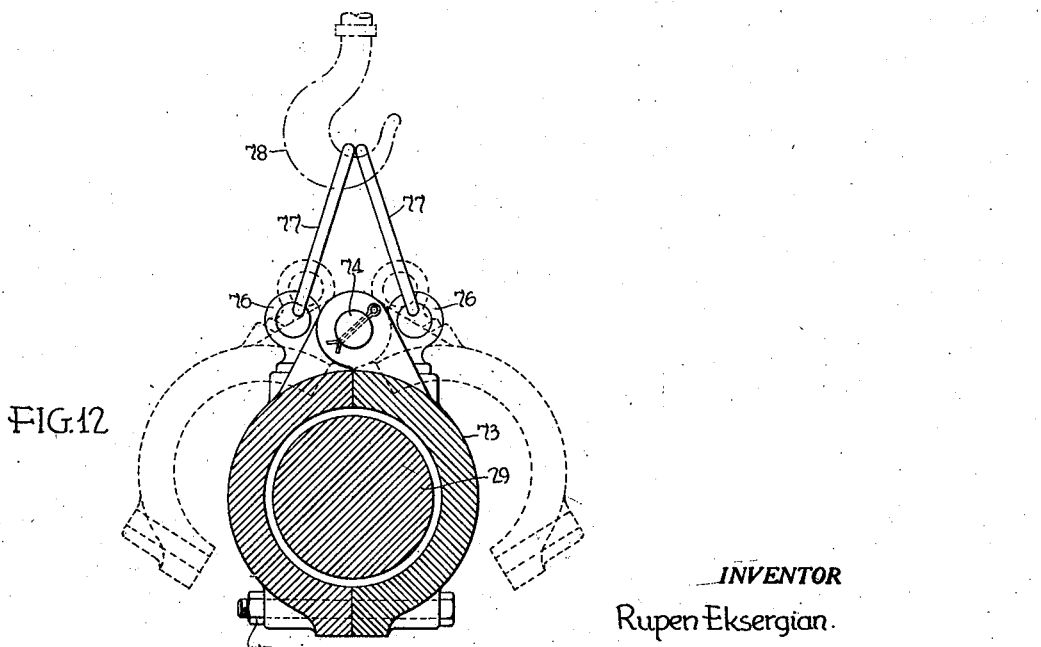
Fig. 12 is an enlarged sectional view through a tension rod and a spacer member used in connection therewith, showing the manner in which these spacer members may be readily lifted off or on the tension rod by the overhead crane.

As shown in Fig. 12, each of the thrust sleeves 73 is formed in two halves which are hinged together at 74 and are secured opposite the hinged point by transverse bolts 75. These sleeves can be readily removed from the rods 29 by releasing the bolts 75. On opposite sides of the pivot pins, the halves are provided with screw-eyes 76 furnished with links 77. After the bolts 75 are disengaged, the overhead crane may be brought in position to engage its hook 78 with the links 77 which causes the halves to swing outwardly about the hinge connection 74 and the sleeve can be lifted off. In the same way, the sleeves may be readily applied to the rods 29. It will be noted that they engage the rods loosely so that they can move endwise under thrust.

It will thus be seen that, by utilizing these given-length spacing sleeves 73 in combination with the screw-threaded portions 71 and nuts 72, a coarse and fine adjustment of the compression frame 28 is readily effected for any one of the widely longitudinally spaced portions determined by the short screw-threaded portions 71.

By reference to Figs. 1 and 2, it will be seen that the tension rods 29 may be in two parts, if desired, connected by a coupling at 79. In testing a short length of work, the outer ends of the rods may be removed by disconnecting the coupling 79. In testing such shorter work, the nuts 72 may be engaged with other of the spaced screw-threaded portions 71 located closer to the hydraulic press 32, and the sleeves 73 may be utilized in this connection in the same way as hereinbefore described.

The apparatus may be further provided with movable thrust-transmitting means arranged between the plunger 36 of the hydraulic press and the body, as 15, being tested, and between the transverse beam 31 and the opposite end of the body. Such means may comprise a vertical compression-resisting structure 80 of a height extending above the car body, this structure being strongly reinforced in various locations and provided with pads 81 at its opposite sides for engagement either directly or through spacers, as 81', respectively, with the machine and with the body to transmit the thrust directly from the machine to the body being tested. To allow these vertical structures 80 to move longitudinally, they are mounted on wheeled carriages, as 82, running upon the rails 41 of the platform 37. In Figs. 1 and 4, the platform is shown at two different elevations, showing the body being tested for compression at two different levels. By utilizing these thrust-transmitting structures 80, it is possible to test the compressive strength of the entire car by bringing the parts in the proper relation and utilizing the proper compression pads and/or spacers between the structures 80 and the car body.

The apparatus of the invention is also provided with means whereby the axis of thrust of the machine may be laterally adjusted so that the line of thrust may be moved away from the central location between the rods 29, which is the normal position, out laterally toward either one of the rods 29. To this end, the hydraulic press is mounted on lateral guideways 83 in the supporting platform 33, and has associated therewith and with the platform an adjusting screw 84, which, when operated, permits the shifting of the machine laterally with respect to the platform. The abutment beam 31 is also provided with a thrust or work engaging member 85 which can be slid laterally on a guideway 86 on the beam to bring it in line with the ram of the hydraulic press.

Figure 9:
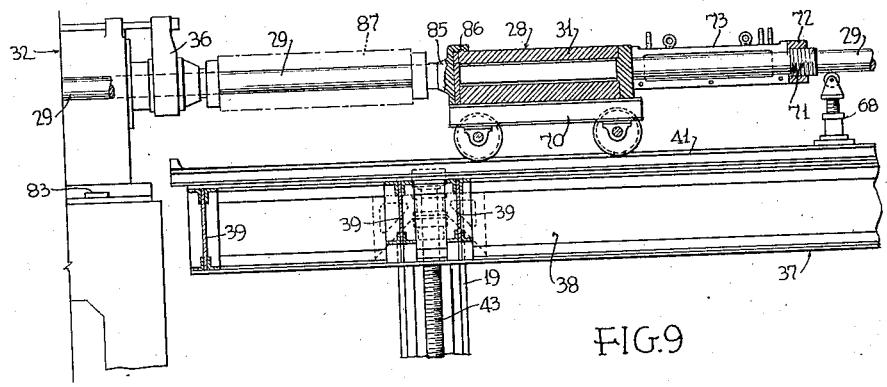
Fig. 9 is a fragmentary longitudinal section showing the apparatus set up to test a relatively short structure.

In Fig. 9, there is illustrated a set-up of the machine for testing a short structural element, shown in dot-and-dash lines and indicated by the numeral 87. In this view, it will be seen that the nut 72 has been moved to the screw-threaded portion 71 nearest the hydraulic press 32, and one-half of the thrust or spacer sleeve 73 is shown in place between the nut 72 and the abutment beam 31, the other half having been omitted to clearly show the construction of this sleeve.

Figure 10:
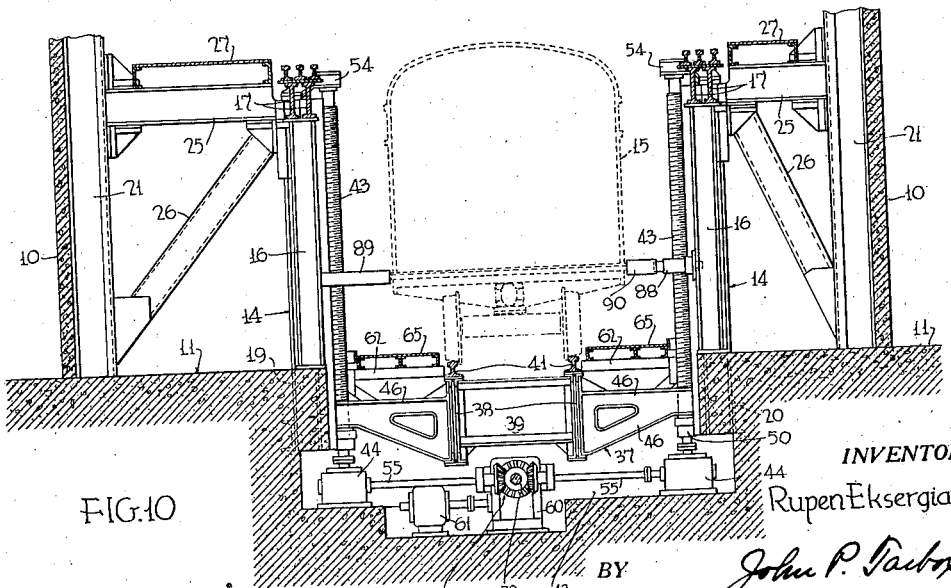
Fig. 10 is a fragmentary transverse section, taken in the same region as Fig. 3, through the apparatus showing a manner of utilization of the apparatus for testing the structure under transverse loads.

In Fig. 10, the car-supporting platform 37 is shown in the lowered position and the car body 15 is disposed between the lateral structures 14. In this position, the car can be tested for its lateral compressive strength at any elevation and for any portion of its length by inserting hydraulic jacks, as 88, at one side of the car body between the car body and the posts 16 of the structure 14, while applying at the same time on the opposite side of the car body, between it and the posts on the opposite side, any suitable reaction member, as 89. Suitable spacer blocks, as 90, may be inserted between the jacks and body.

From the foregoing description, it will be seen that the apparatus can be set up quickly and accurately to test various-length structures for compression strength and to test them at various levels or at various local points transversely of their ends. It is also possible, with this apparatus, to test the cars or similar structures for transverse compression at various points along their length or height. The apparatus of the invention obtains a flexibility not heretofore obtained in apparatus of this class. The features which make possible this flexibility and adaptability to various forms of structure, while described herein in detail, are believed capable of considerable variation and modification without departing from the spirit and scope of the invention as set forth in the appended claims.

What is claimed is:

1. A testing apparatus for large structures such as railway cars comprising a machine including a rigid rectangular frame comprising spaced transverse beams and spaced parallel substantially horizontal tension rods tied together by said spaced transverse beams, work engaging members adapted to engage a structure to be tested, and a press having its line of thrust parallel to and intermediate the rods and substantially in the plane thereof, said press including two members for exerting pressure in opposite directions, one of said last-named members reacting against one of said beams, and the other one of said last-named members having formed thereon one of said work engaging members and being opposed to the other of said beams provided with the other work engaging member to receive the structure to be tested between them, a work support for supporting the structure to be tested in position for operation thereon by the machine, and means adapted for moving relative to each other said work engaging members and work support substantially vertically and transversely of the plane of the frame to bring different planes of the structure to be tested into the line of thrust of the machine.

2. A testing apparatus for structures such as railway cars comprising a compression machine including a press having two members exerting pressure in opposite directions and a rectangular substantially horizontally arranged rigid frame comprising spaced parallel tension rods and spaced transverse abutment beams connecting the tension rods, the line of thrust of said press and tension rods being arranged in the same plane with one of said members reacting against the inner face of one of said abutment beams, and the other member providing an abutment opposed to the other of said transverse abutment beams, a platform for supporting a structure to be tested in the space formed by said rectangular frame, and means for relatively moving said compression machine and platform substantially vertically and at right angles to the plane of said frame to bring any level of the structure to be tested in said plane.

3. A testing apparatus for large structures such as railway cars comprising a compression machine including a rigid rectangular frame comprising spaced transverse abutment beams and spaced parallel tension rods tied together by said abutment beams, and a press having its line of thrust parallel to and normally intermediate the rods and substantially in the plane thereof, said press including a pair of members, one of said members reacting against the inner face of one of said abutment beams and the other member providing an abutment opposed to the other of said abutment beams to receive a structure to be tested between them, means for holding the structure to be tested in a predetermined position between said rods, said press being adjustable transversely to bring its line of thrust closer to and farther away from one of said rods, respectively.

4. A testing apparatus for railway cars comprising a compression machine adapted to compress the work in substantially horizontal direction between its opposite ends, said compression machine being arranged and supported at a level above floor level, a platform normally arranged at floor level and carrying tracks lining up with tracks from which a car to be tested may be run onto the platform, means for raising said platform by predetermined increments to bring various levels of the car being tested to the compression level of said machine.

5. A testing apparatus for railway cars permitting the compression-testing of the cars longitudinally and transversely, the longitudinal testing means comprising a compression machine having means for applying pressure to the opposite ends of the car, the lateral testing means comprising vertical posts arranged at spaced intervals along the opposite sides of the car and anchored to a fundation and braced to said foundation by diagonal members extending from adjacent the tops of the posts to said foundation, said vertical posts and their braces not only acting to support members of the compression machine, but serving also as reaction points for pressure applied laterally of the car structure.

6. A testing apparatus for railway cars or the like comprising a compression machine including a rigid rectangular frame comprising spaced transverse abutment beams and spaced parallel tension rods tied together by said abutment beams, and a press having its line of thrust parallel to and intermediate the rods and substantially in the plane thereof, said press transmitting its thrust against the inner face of one of said abutment beams and providing an abutment opposed to the other of said abutment beams, a platform for supporting a car to be tested in the space between said last-named abutment and its opposed abutment beam, means for relatively moving said compression machine and platform at right angles to the plane of the machine to bring different levels of the car into said plane, and rigid vertical structures arranged one between each of the last-named abutment and the opposed abutment beam and the adjacent car ends, whereby compression thrust of the machine may be applied throughout substantially the entire height of the car being tested.

7. A testing apparatus for railway cars or the like comprising a compression machine including a rigid rectangular frame comprising spaced transverse abutment beams and spaced parallel tension rods tied together by said abutment beams, and a press having its line of thrust parallel to and intermediate the beams and substantially in the plane thereof, said press including a means transmitting its thrust against the inner face of one of said abutment beams, and another means providing an abutment opposed to the other of said abutment beams, a platform carrying rails for supporting a car to be tested in the space between said last-named abutment and its opposed abutment beam, means for relatively moving said compression machine and platform at right angles to the plane of the machine to bring different levels of the car into said plane, a rigid vertical structure movably supported on the rails of said platform, one at each end and arranged between each of said last-named abutment and the opposed abutment beam and the adjacent car ends, whereby the compression thrust of the machine may be applied throughout substantially the entire height of the car being tested.

8. A testing apparatus for railway cars or the like comprising a floor-level foundation, spaced parallel rows of pillars anchored to said foundation and braced from their upper portions to the foundation by inclined braces, a platform for supporting a car to be tested disposed between said rows of pillars, means associated with certain of said pillars for raising and lowering the platform and guiding it in its vertical movement, a compression machine supported in part from said pillars and in part from a raised platform at one end of said rows of pillars, said compression machine comprising a rectangular frame including a pair of rods, one supported by each row of pillars, and spaced transverse abutment beams, one of which is supported from said pillars, said one of said transverse abutment beams and the rods for most of their length being mounted on rollers permitting longitudinal movement, the compression machine further comprising a press mounted on said raised platform and having its thrust axis paralleling the rods and arranged to transmit its thrust through one of its relatively movable members to the inner face of the adjacent transverse abutment beam, the other of its relatively movable members providing an abutment in opposed relation to the other abutment beam and spaced therefrom to receive the structure being tested between them.

9. A testing apparatus for testing structures under compression, comprising a compression machine including transverse abutment beams and spaced longitudinal tension rods interconnected at spaced points by said beams, and a press forming an abutment opposed to one of said abutment beams and reacting against the other of said beams, a structure to be tested being received between the press and its opposed abutment beam, said opposed abutment beam being adjustable along said rods, said rods being provided at spaced locations along their length with diametrically enlarged threaded portions of relatively short length, spacer members and nuts on said rods adapted to take the thrust from said last-named abutment beam and transmit it to said rods, said nuts cooperating with the threads at any one of said locations and with said spacer members, depending upon the length of the structure being tested.

10. A testing apparatus for testing structures especially large structures such as railway cars under compression, comprising a compression machine including transverse abutment beams and spaced longitudinal tension rods interconnected at spaced points by said beams, and a press reacting against one of said abutment beams, a structure to be tested being received between said press and the other abutment beam, said last-named beam being shiftable along said rods, longitudinally adjustable shoulders on the rods against which the abutment beam reacts, and readily removable and replaceable spacer sleeves on said rods for insertion between said beam and said shoulders.

11. A testing apparatus for testing structures under compression, comprising a compression machine including transverse abutment beams and spaced longitudinal tension rods interconnected at spaced points by said beams, one of said beams carrying a thrust member adjustable thereon in a direction transversely to said rods to various positions, and a press acting between the other of said abutment beams and, through the structure being tested, the thrust member of said first-named beam, said press being adjustably movable transversely of the direction of its thrust, whereby it may be aligned with the various transverse positions of the thrust member, and means for so adjusting said press in any adjustable position.

12. In a testing apparatus for large structures such as railway cars; a foundation structure; a rigid rectangular frame comprising spaced transverse beams and spaced generally parallel tension rods tied together by said spaced transverse beams, pressure exerting means having a line of thrust parallel to and intermediate the rods and substantially in the plane thereof; said pressure exerting means acting between one of said beams and, through a structure to be tested, the other of said beams; said frame and said pressure exerting means being supported by said foundation structure; a work support on said foundation structure for supporting the structure to be tested in position for operation thereon by the apparatus; and means adapted for relatively moving one of said pressure exerting means and said work support relative to the other and to the foundation structure in a direction transversely of the plane of the frame to bring different planes of the structure to be tested into the line of thrust.

RUPEN EKSERGIAN.

REFERENCES CITED

The following references are of record in the file of this patent:

UNITED STATES PATENTS

| Number | Name | Date |
|---|---|---|
| 17,383 | Lowthorp | May 26, 1857 |
| 278,916 | Emery | June 5, 1883 |
| 1,890,923 | Wilson | Dec. 13, 1922 |
| 1,865,070 | Amsler | June 28, 1932 |
| 1,985,598 | Carver | Dec. 25, 1934 |